United States Patent Office 3,420,539
Patented Jan. 7, 1969

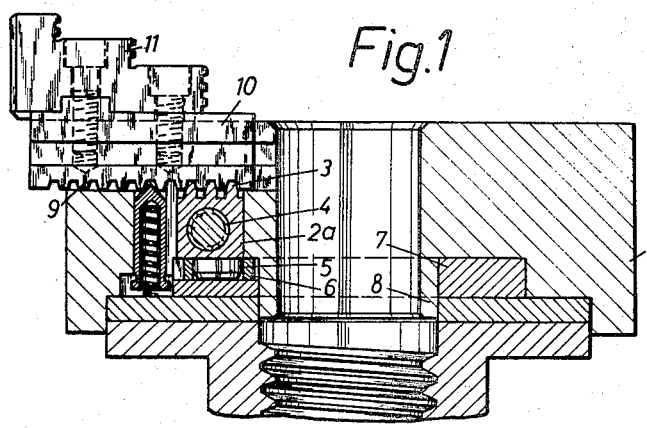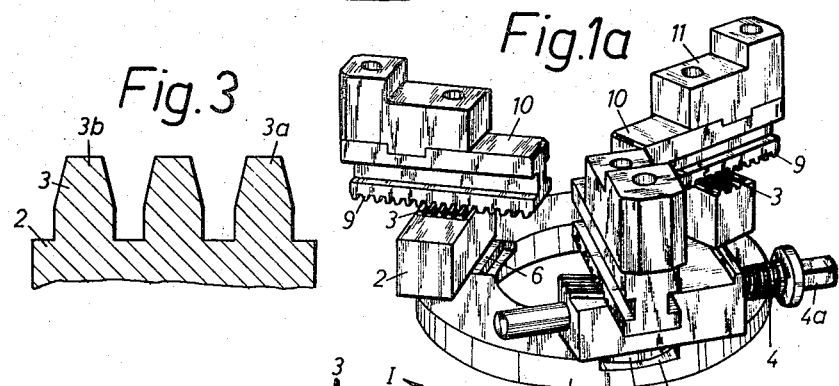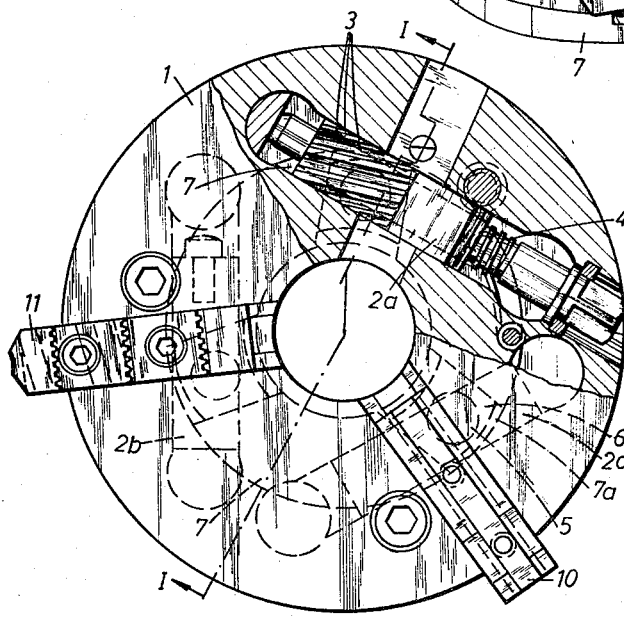

3,420,539
MANUALLY OPERABLE CHUCK FOR LATHES AND OTHER MACHINE TOOLS
Gotthold Pahlitzsch and Waldemar Hellwig, Braunschweig, Germany, assignors to Paul Forkardt K.G., Dusseldorf, Germany
Filed Nov. 9, 1966, Ser. No. 593,116
Claims priority, application Germany, Nov. 11, 1965, F 47,657
U.S. Cl. 279—112                                    7 Claims
Int. Cl. B23b 31/12

The present invention concerns a centrally clamping chuck for lathes and other machine tools which is operable by hand. Chucks are known in which the basic jaws are adjusted by a drive ring through the intervention of wedge bars arranged tangentially in the chuck body, one of said wedge bars having arranged therein a threaded spindle for actuating the chuck. Such chucks yield a high transmission ratio and with the same chuck size and the same introduced wrench torque are able to produce a clamping force which is a multiple of the clamping force obtainable with chucks of other heretofore known designs.

Experience has shown that the precision of locating a chucked work-piece (precision of true roundness) with a construction of the above mentioned type depends on the magnitude of the clamping force. Since, however, it is necessary, depending on the job to be performed, to operate with different forces, the above referred to drawback is frequently interfering with the proper operations. This drawback is due to the fact that the path of the force from the place where it is introduced (threaded spindle) to the clamping jaw with jaws moved by the driving ring is longer than with the directly driven jaw and that more parts take part in this power transmission, as for instance studs, sliding members, and drive ring.

The power transmission to the drive ring actuated jaws is thus more elastic and less stiff than the power transmission to the directly driven jaws. The indirectly actuated jaws, therefore, will due to their greater resiliency during the build-up of the clamping force proper lag more than the directly driven jaws and, accordingly, the three jaws will with increasing force occupy different radial positions.

It is, therefore, an object of the present invention to provide a manually operable chuck which will overcome the above mentioned drawback.

It is another object of this invention to provide a chuck as set forth in the preceding paragraph, which is relatively simple in construction and highly reliable and in particular will assure a more precise loaction of the chucked work piece.

These and other objects and advantages of the invention will appear more clearly from the following specification in connection with the accompanying drawing, in which:

FIG. 1 illustrates a cross section through a chuck according to the invention, said cross section being taken along the line I—I of FIG. 2.

FIG. 1a illustrates in perspective view the relation of chuck parts with the chuck body removed.

FIG. 2 illustrates partly in section a top view of the chuck of FIG. 1.

FIG. 3 represents an enlarged illustration of the tooth spaces employed in connection with the chuck according to the invention.

The manually operable chuck according to the invention, the basic jaws of which are adjusted by a driving ring through wedge bars arranged tangentially in the chuck body while one of the wedge bars is driven directly by a threaded spindle, is characterized primarily in that the stiffness between the wedge bar driven directly by the threaded spindle and the basic jaw is less than the stiffness between the other wedge bars and the basic jaws pertaining thereto.

With the same total stiffness of all power transmissions, an equal spring-back of all jaws is obtained and thus a uniform clamping precision regardless of whether great forces or small forces are employed. This reduction in the stiffness can be realized in various ways. Thus, it is possible to design the tooth spaces of the directly driven basic jaws and/or their wedge bars deeper and/or wider than those of the other wedge bars and basic jaws. The resiliency between the directly driven basic jaw and the wedge bar pertaining thereto is by the just mentioned design of the tooth spaces increased and adapted to the stiffness of the remaining jaws. However, if desired, the directly driven basic jaw and/or its wedge bar may be made of a material with a lower elasticity modulus than the other basic jaws and their wedge bars so that in this way the stiffness of all transmitting parts will be the same.

Referring now to the drawing in detail, the chuck body 1 has guided therein in a manner known per se the wedge bars 2 which are provided with straight teeth 3. One of the wedge bars 2a is directly driven by a threaded spindle 4 which may be turned by means of a wrench placed upon the square head 4a of said spindle 4. The rear side of each wedge bar 2 is provided with a follower stud 5 which is surrounded by a block or ring 6. These blocks 6 are guided in grooves 7a of a drive ring 7 which is journalled behind the wedge bars 2 on a hub 8 of the chuck body 1. When the threaded spindle 4 is turned, the wedge bar 2a is displaced. By means of the follower stud 5, the drive ring 7 is likewise turned so that the two wedge bars 2b and 2c will be displaced. The teeth 3 of the wedge bars mesh with the teeth 9 of the basic jaws 10 so that when the wedge bars 2 are displaced, the said basic jaws 10 with the auxiliary jaws 11 will be displaced in radial direction for clamping or releasing the tool.

In order to compensate for the higher spring or resiliency between the wedge bar 2a through studs, blocks and drive ring 7 to the non-directly driven wedge bars 2b and 2c and their corresponding basic jaws, the tooth spaces 3a(FIG. 3) of the directly driven wedge bar 2a are deeper than corresponds to the meshing engagement with the teeth 9 of the basic jaw. In this way additional tooth space portions 3b are obtained which bring about a resiliency of the teeth 3, and it will thus be possible to obtain uniform total stiffness of all three power transmissions and to increase the precision of the chuck with regard to truth of rotation.

A lower stiffness of the transmission from wedge bar 2a to its basic jaw can also be obtained in a different way, for instance by making said wedge bar and/or its basic jaw of a material having a lower elasticity modulus than the other wedge bars and the basic jaws.

It is, of course, to be understood that the present invention is, by no means, limited to the particular construction shown in the drawing but also comprises any modifications within the scope of the appended claims.

What we claim is:

1. A manually operable chuck, especially for lathes and similar machine tools, which includes: a plurality of basic jaws radially movable in said chuck body, a plurality of wedge bars tangentially movable in said chuck body and respectively operatively engaging said basic jaws for adjusting the same in response to a movement of said wedge bars, a threaded spindle directly drivingly connected to one of said wedge bars for directly moving said one wedge bar, and drive ring means rotatably journalled in said chuck body and operatively connected to all of said wedge bars whereby in response to being actuated by said directly spindle driven wedge bar said drive ring means will actuate the other wedge bars for displacement of the basic jaws pertaining thereto, the stiffness between said directly spindle driven wedge bar and the basic jaw operatively engaged thereby being less than the stiffness between the ring means actuated wedge bars and the basic jaws operatively engaged thereby.

2. A chuck according to claim 1, in which both said wedge bars and the basic jaws engaged thereby are respectively provided with interengaging teeth.

3. A chuck according to claim 2, in which the tooth spaces of the directly spindle driven wedge bar and of the basic jaw engaged thereby are deeper than is the case with the respective interengaging remaining wedge bars and basic jaws.

4. A chuck according to claim 2, in which the tooth spaces of the directy spindle driven wedge bar and of the basic jaw engaged thereby are wider than is the case with the respective interengaging remaining wedge bars and basic jaws.

5. A chuck according to claim 2, in which the tooth spaces of the directly spindle driven wedge bar and of the basic jaw engage thereby are deeper and wider than is the case with the respective interengaging remaining wedge bars and basic jaws.

6. A chuck according to claim 1, in which at least the teeth of at least one of the two members respectively formed by the directly spindled riven wedge bar and the basic jaw engaged thereby consists of a material having an elastic modulus less than that of the other respective interengaging wedge bars.

7. A chuck according to claim 1, in which at least the teeth of at least one of the two members respectively formed by the directly spindle driven wedge bar and the basic jaw engaged thereby consists of a material having an elastic modulus less than that of the other basic jaws.

References Cited

UNITED STATES PATENTS 2,602,673   7/1952   Devring _____ 279—112

ROBERT C. RIORDON, *Primary Examiner.*

D. R. MELTON, *Assistant Examiner.*